United States Patent
Ford et al.

(10) Patent No.: US 10,871,220 B2
(45) Date of Patent: Dec. 22, 2020

(54) SHIFTER MECHANISM WITH MANUAL SHIFT FUNCTION

(71) Applicant: Lokar, Inc., Knoxville, TN (US)

(72) Inventors: Kevin Ford, Knoxville, TN (US); Scott Thiel, Sherwood, OR (US)

(73) Assignee: Lokar, Inc., Knoxville, TN (US)

( * ) Notice: Subject to any disclaimer, the term of this patent is extended or adjusted under 35 U.S.C. 154(b) by 266 days.

(21) Appl. No.: 15/950,795

(22) Filed: Apr. 11, 2018

(65) Prior Publication Data

US 2018/0292000 A1    Oct. 11, 2018

Related U.S. Application Data

(60) Provisional application No. 62/484,204, filed on Apr. 11, 2017.

(51) Int. Cl.
*F16H 59/02*    (2006.01)
*F16H 61/18*    (2006.01)

(52) U.S. Cl.
CPC ......... *F16H 59/0204* (2013.01); *F16H 61/18* (2013.01); *F16H 2059/026* (2013.01); *F16H 2059/0239* (2013.01); *F16H 2061/185* (2013.01); *Y10T 74/2011* (2015.01); *Y10T 74/20067* (2015.01)

(58) Field of Classification Search
CPC .................. F16H 59/0204; F16H 61/18; F16H 2059/026; F16H 2061/185; F16H 2059/0239; Y10T 74/02267; Y10T 74/2011; Y10T 74/20067
See application file for complete search history.

(56) References Cited

U.S. PATENT DOCUMENTS

| | | | | |
|---|---|---|---|---|
| 6,148,686 A | * | 11/2000 | Kataumi | F16H 59/0204 74/473.12 |
| 6,530,293 B1 | * | 3/2003 | Ruckert | F16H 59/105 324/207.23 |
| 7,750,624 B2 | * | 7/2010 | Heo | F16H 59/0204 324/207.23 |
| 8,539,851 B2 | | 9/2013 | Hoffman | |
| 10,288,165 B2 | * | 5/2019 | Makimura | F16H 59/0204 |
| 10,323,742 B2 | * | 6/2019 | Kvarnstrom | F16H 59/0204 |
| 2007/0068325 A1 | * | 3/2007 | Rudelic | F16H 59/0278 74/523 |

* cited by examiner

*Primary Examiner* — Jeremy R Severson
(74) *Attorney, Agent, or Firm* — Pitts & Lake, P.C.

(57) ABSTRACT

An automatic transmission shifter mechanism that is selectable between an automatic transmission mode and a manual shifting mode, including a shifter assembly configured to move in a first range of movement to be positioned in the automatic transmission mode, and to move in a second range of movement to selectively shift gears up and down in the manual shifting mode, a first sensor configured to sense that the shifter assembly is in the automatic transmission mode in response to the shifter assembly being in the first range of movement, and at least a second sensor configured to sense gear changes in the manual shifting mode, wherein the shifter assembly is configured to be selectively moved laterally from the first range of movement to the second range of movement when in a drive mode in the first range of movement.

11 Claims, 5 Drawing Sheets

SHIFTER MECHANISM WITH MANUAL SHIFT FUNCTION

CROSS-REFERENCE TO RELATED APPLICATIONS

This application claims the benefit of U.S. Provisional Patent Application No. 62/484,204, filed on Apr. 11, 2017, which is incorporated herein in its entirety by reference.

FIELD OF INVENTION

The present general inventive concept relates to vehicle shifter mechanisms, and, more particularly, to an automatic transmission shifter mechanism with a manual shift function.

BACKGROUND

Automatic transmission shifters typically provide one or more features for preventing accidental shifting in different drive modes in order to prevent damage to the vehicle and to provide safety to the driver and passengers. These features are typically known as "lockout." For example, lockout features may prevent accidental shifting from a park position into reverse, drive, and low gears. In various conventional assemblies, a button may be provided to disengage the lockout position and to allow the operator the ability to shift. Other approaches also include moving the shifter generally perpendicularly to its normal direction of travel in order to disengage the lockout function.

While lockout can be very beneficial in the transition from park into reverse and from park into drive, when transitioning between lower and higher gears it might be desirable to allow free shifting without having to disengage the lockout function. Such a feature may more closely replicate the sensations of driving a manual transmission vehicle, and give more control to the operator of the vehicle.

In light of the above, there is a need for an automatic transmission shifter mechanism with a manual shift function. There is a further need for an automatic transmission shifter mechanism which can allow the operator to shift the lever from an overdrive mode into a sport mode, in which the lockout function is disengaged, and the operator is able to shift freely between gears without being encumbered by various lockout controls.

BRIEF SUMMARY

According to various example embodiments of the present general inventive concept, an automatic transmission shifter mechanism that is readily selectable between an automatic transmission mode and a manual shifting mode by a simply lateral movement of a gear shifter when in a drive mode, allowing the operator to manually and easily shift gears up or down when desired.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing an automatic transmission shifter mechanism that is selectable between an automatic transmission mode and a manual shifting mode, including a shifter assembly configured to move in a first range of movement to be positioned in the automatic transmission mode, and to move in a second range of movement to selectively shift gears up and down in the manual shifting mode, a first sensor configured to sense that the shifter assembly is in the automatic transmission mode in response to the shifter assembly being in the first range of movement, and at least a second sensor configured to sense gear changes in the manual shifting mode, wherein the shifter assembly is configured to be selectively moved laterally from the first range of movement to the second range of movement when in a drive mode in the first range of movement.

The foregoing and/or other aspects and advantages of the present general inventive concept may be achieved by providing an automatic transmission shifter mechanism that is selectable between an automatic transmission mode and a manual shifting mode, including a shifter assembly, a block attached to the shifter assembly, a pin attached to the block, at least one slotted plate which interacts with the shifter assembly, and a detent plate proximate to the block, wherein selected shifter assembly positions in the automatic transmission mode are maintained by the pin being located within a corresponding detent of the detent plate, and wherein a predetermined movement of the shifter assembly causes the pin to move out of range of detents in the detent plate such that an operator can shift freely between drive gears in the manual shifting mode.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various examples of the present general inventive concept provide an automatic transmission shifter mechanism with a selectable manual shift function. In various example embodiments, the shifting mechanism may be used in the normal upright position to shift between the conventional positions in an automatic transmission configuration, and the shifter may be pushed laterally to a manual shifting position to disengage the normal automatic transmission mode. The example embodiments described herein are described with reference to an automatic shifter mechanism of the type having a lockout button integrated in the center of the knob. However, those skilled in the art will recognize that the present general inventive concept may be implemented using a host of other methods and/or configurations to disengage the lockout system to allow manual up and down shifting. In the descriptions of the various example embodiments herein, the automatic transmission mode may be referred to interchangeably by such terms as the normal automatic transmission mode, the normal automatic shifting mode, the normal mode, etc., and the selectable manual shifting mode may be referred to interchangeably by such terms as the manual mode, the manual transmission mode, etc.

Figure 1:
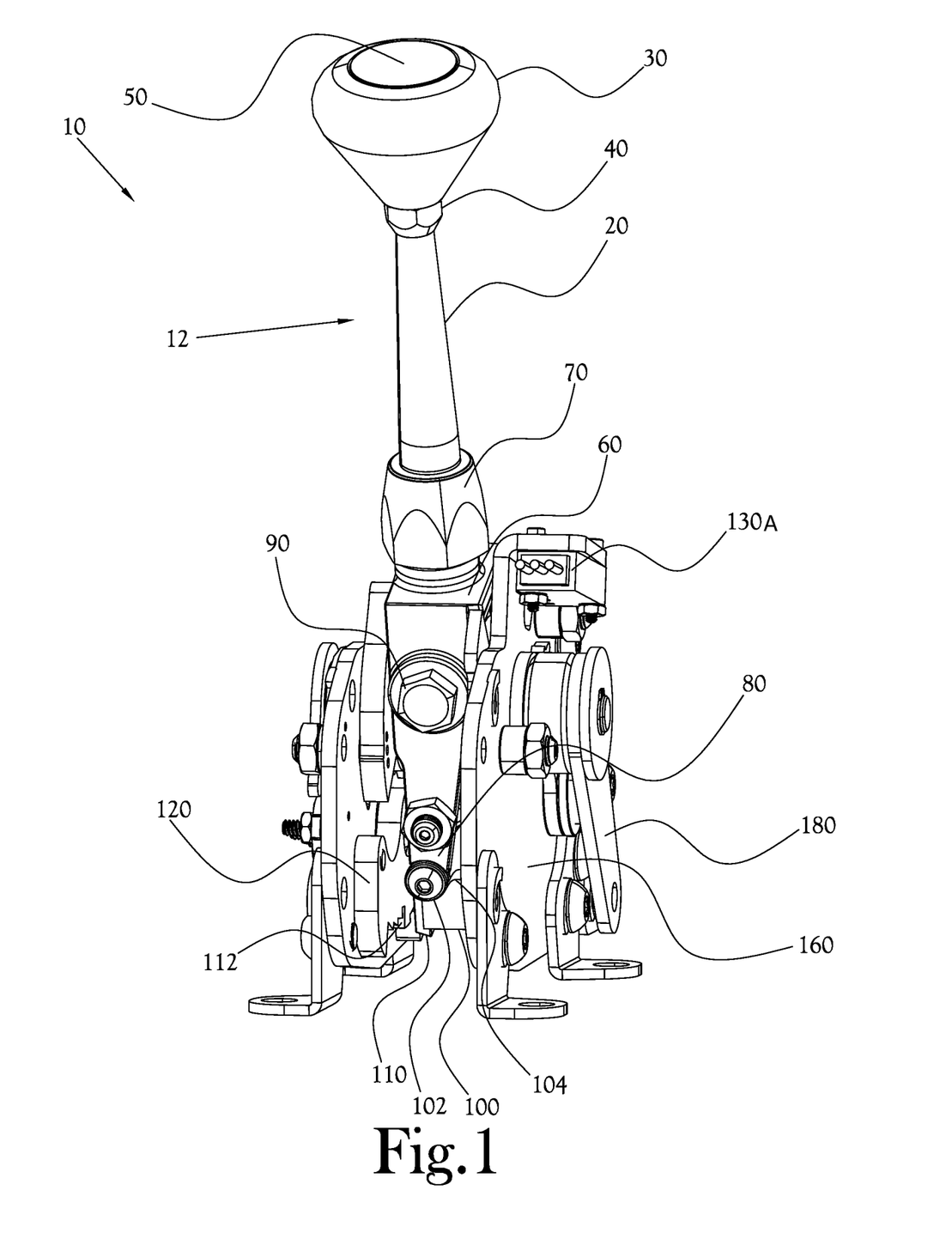
FIG. 1 illustrates a perspective view of an automatic transmission shifter mechanism with a selectable manual shifting function according to an example embodiment of the present general inventive concept.
Figure 2:
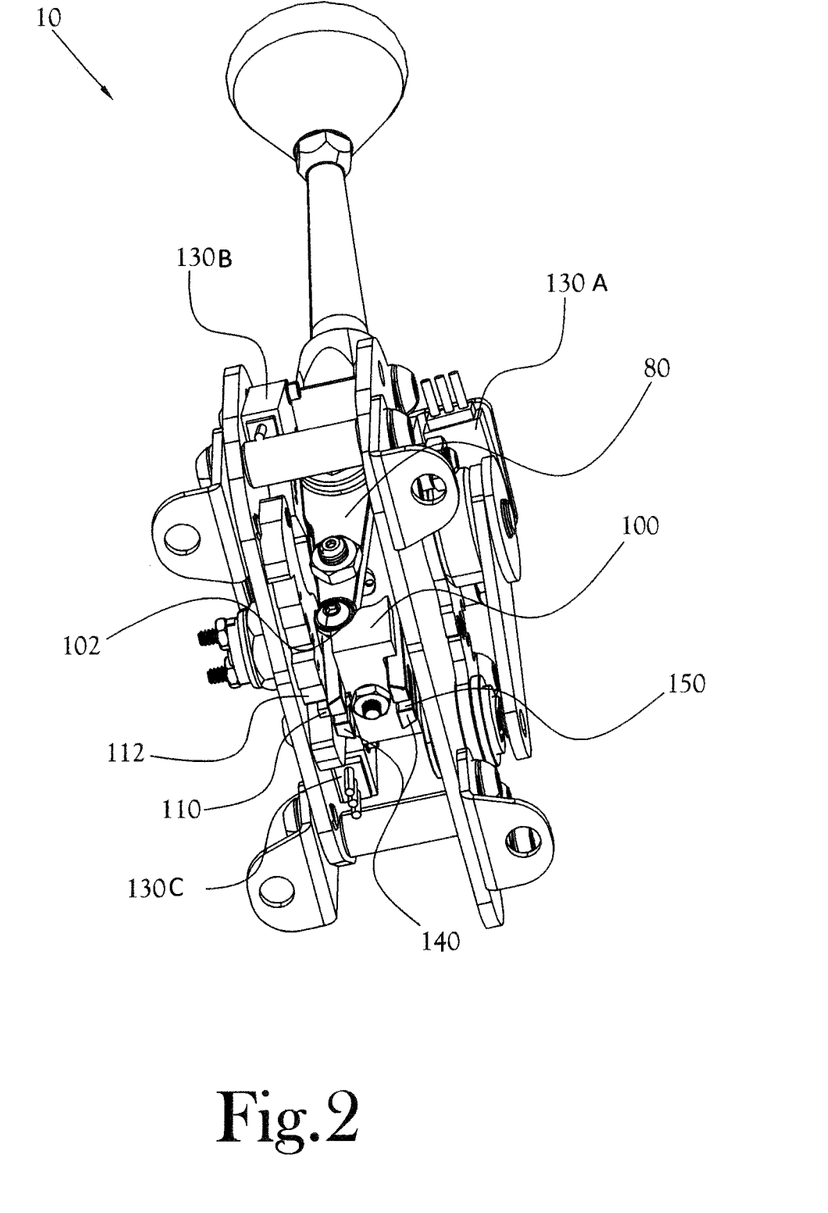
FIG. 2 illustrates a bottom view of the automatic transmission shifter mechanism of FIG. 1.
Figure 3:
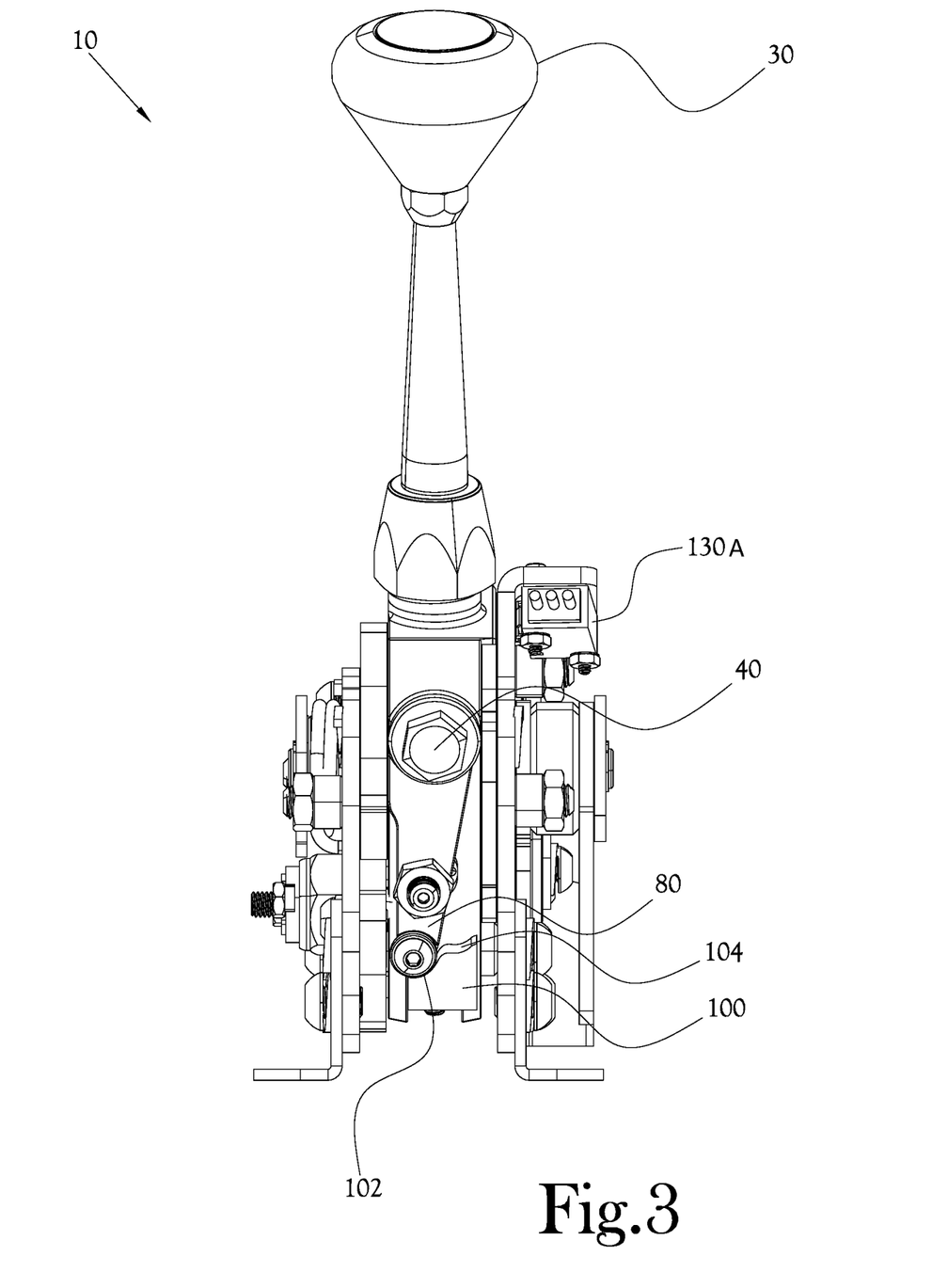
FIG. 3 illustrates a front view of the automatic transmission shifter mechanism of FIG. 1 in the automatic shifting position.

FIG. 1 illustrates a perspective view of an automatic transmission shifter mechanism with a selectable manual shifting function according to an example embodiment of the present general inventive concept, FIG. 2 illustrates a bottom view of the automatic transmission shifter mechanism of FIG. 1, and FIG. 3 illustrates a front view of the automatic transmission shifter mechanism of FIG. 1 in the automatic shifting position. Certain components have been omitted from the illustrations in FIGS. 1 and 3 so that certain other components provided deeper inside the assembly may be seen more clearly. The transmission shifter mechanism illustrated in FIGS. 1-3 is illustrated as being in the normal automatic transmission mode. In the example embodiment illustrated in FIG. 1, an automatic transmission shifter mechanism 10 with a manual shift function includes a shaft 20 having a shifter knob 30 installed thereon by way of an upper nut 40. Integrated with the knob 30 and flush with the top of the knob 30 is the lockout button 50. The shaft 20 is attached to a shifter base 60 by way of a lower nut 70, which is threaded onto a protrusion from the shifter base 60. A lower shaft projection 80 extends downward from a bottom of the shifter base 60, and has a position holding member provided proximate a distal end thereof that is configured to interact with a lower block 100 as described herein. The knob 30, shaft 20, shifter base 60, and lower shaft projection 80 are components of a shifter assembly 12 that are configured to move as one integral unit and rotate about a first pivot point 200 (illustrated in FIG. 5) when operating in a standard automatic transmission mode and when changing gears in the manual shifting mode, and to rotate about a second pivot point 90 centered on the large hexagonal bolt head on the shifter base 60 when moving the shifter into and out of the manual shifting mode. As discussed in more detail herein, in the example embodiment illustrated in FIGS. 1-5 the axis of rotational movement of the shifter assembly 12 into and out of the manual shifting mode is substantially perpendicular to the axis of rotational movement of the shifter assembly 12 when changing gear positions in the normal automatic shifting mode.

The lower block 100 is coupled to a bottom of the shifter assembly 12 proximate the distal end of the lower shaft projection 80. In this example embodiment of the present general inventive concept, the position holding member provided proximate the distal end of the lower shaft projection 80 is configured to project from opposite sides of the lower shaft projection 80 to interact with the lower block 100, and is formed as circular members proximate forward and back distal ends of the lower shaft projection 80 to interact with at least one detent provided in an upper surface of the lower block 100 to hold the shifter assembly 12 in place in the manual shifting mode. In the example embodiment illustrated in FIG. 3, an upper surface of the lower block 100 is configured to have a lower detent 102 and an upper detent 104 with a ridge therebetween. As illustrated in FIG. 3, when the shifter assembly 12 is being operated in the normal automatic mode, the position holding member of the lower shaft projection 80 rests in the lower detent 102. Conversely, when the shifter assembly 12 is being operated in the manual shifting mode, the position holding member of the lower shaft projection 80 will rest in the upper detent 104, which holds the shifter assembly 12 in place in the manual shifting mode as will be described in more detail herein. In various example embodiments of the present general inventive concept, the position holding member of the lower shaft projection 80 may not rest in the lower detent 102 when in the normal automatic mode, and/or the lower detent 102 may not even be provided, as various other structures of the shifter mechanism 10 hold the shifter assembly 12 in the vertical position, i.e., the normal automatic shifting mode, during operation. The position holding member of the lower shaft projection 80 may be configured to operate in register with the upper and lower detents 104,102, and may be configured as a rolling member to aid in a user's movement of the shifter assembly 12 between automatic and manual modes.

As illustrated in FIG. 3, the lower shaft projection 80 is shown in a position resting in register with the lower detent 102 of the lower block 100, which holds the shifter assembly 12 in the normal automatic mode. In various example embodiments of the present general inventive concept, a rod (not shown) may extend through the shaft 20 so as to couple the lockout button 50 to the lower block 100 such that pressing the lockout button 50 will push the lower block 100 downward away from the lower shaft projection 80. A spring mechanism (not shown) within the space between the lockout button 50 and the lower block 100 provides an upward force to keep the lower block 100 biased in the raised, lockout position. By depressing and releasing the lockout button 50, the operator is able to control the downward and upward motion of the lower block 100. As illustrated in FIG. 1, a detent plate 120 is provided in a fixed position generally adjacent to the lower shaft projection 80 and lower block 100. The detent plate 120 is fixed to one of two main side plates 160 that are provided at either side of the shifter mechanism 10 which frames a large portion of the components that are cooperating between the two main side plates 160. A lower block pin 110 is configured to protrude from the lower block 100 in a direction toward the detent plate 120 so as to register with the detents 112 of the detent plate 120, depending upon the position of the shifter assembly 12, while the lockout button 50 is in the raised position. Thus, when the lockout button 50 is not pressed, and therefore the shifter assembly 12 is in lockout mode, accidental shifting from a park position into reverse, or between drive and low gears, etc., may be prevented. By pressing the lockout button 50, lower block 100 and therefore the lower block pin 110 is moved generally downward, away from the detents 112, to "unlock" the shifter and allow the operator to shift gears.

FIG. 2 illustrates a view of the automatic transmission shifter mechanism 10 from the underside. The lower block 100 can be seen with the lower block pin 110 resting within one of the detents 112 of the detent plate 120, and the lower shaft projection 80 is shown in one possible position resting in register with the lower detent 102 of the lower block 100. As illustrated in this example embodiment of the present general inventive concept, two channel guides 140 are provided at the distal end of the lower shaft projection 80, and configured so as to be located along either side of the lower block 100. The lower block pin 110 and a ridge 150 on the opposing side of the lower block 100 rest within the channel guides 140, such that the channel guides 140 restrain the lateral movement of the lower block 100 and position the lower block 100 such that the pin 110 is generally adjacent to the detents 112. As illustrated in FIG. 2, the distal end of the lower shaft projection 80 is generally configured with an open receiving portion in which the lower block 100 rests, and the lower block 100 moves partially out of the receiving portion, and guided by the two channel guides 140 interacting respectively with the lower block pin 110 and ridge 150, when the lockout button 50 is pressed. Thus, in the normal automatic shifting mode, when the shifter assembly 12 is oriented vertically, the position of the shifter assembly 12, and therefore the gear position corresponding to the position of the shifter assembly 12, is determined by which of the detents 112 of the detent plate 120 that the lower block pin 110 is in register. The limits of forward and back movement of the shifter assembly 12 is limited by the terminating edges of the detent plate 120 configured at either end of the detents 112.

FIG. 3 illustrates a front view of the automatic transmission shifter mechanism 10 in which the lower shaft projection 80 is shown in one possible position resting in register with the lower detent 102 of the lower block 100. In this position, the vehicle is in normal automatic transmission mode, and the operator is required to disengage the lockout in order to shift freely from a park position into reverse, neutral, drive, and low gears. In this mode, the lower block pin 110 is engaged with one of the corresponding detents 112 in any of the park, reverse, neutral, drive, and low gear positions.

A plurality of electronic shifter modules 130A, 130B, 130C are provided to control various operations of gear shifting in automatic and manual modes. In the example embodiment of the present general inventive concept illustrated in FIGS. 1-3, a first electronic shifter module 130A is provided proximate a top portion of one of the main side plates 160. The first electronic shifter module 130A of this example embodiment is configured to sense when the shifter assembly 12 is in the normal automatic mode or the manual shifting mode. In various example embodiments, the first electronic shifter module 130A is configured to have a switch that is closed to indicate that the shifter module 130 is in the vertical position, i.e., the normal automatic mode. The example embodiment illustrated in FIGS. 1-3 may include a first electronic shifter module 130A that includes a biased member that is biased in the direction of the shifter base 60, and wherein contact between the shifter base 60 and the biased member presses a button to actuate the switch to indicate the normal automatic mode. The biased member may be provided with a rolling member to maintain contact between the fixed first electronic shifter module 130A and the adjacent side of the shifter base 60 during rotational movement of the shifter base 60 during normal movement of the shifter assembly 12. Axles provided to the rolling member may provide the force to push a button that actuates the switch of the first electronic shifter module 130A indicating the normal automatic mode. When the shifter assembly 12 is moved to the manual shifting position, as discussed herein in regard to FIGS. 4-5, contact between the shifter base 60 and the biased member of the first electronic shifter module 130A is lost, opening the aforementioned switch and indicating that the operator has selected the manual shifting position. The electronic shifter modules 130A, 130B, 130C are illustrated with attached cable leads.

Figure 4:
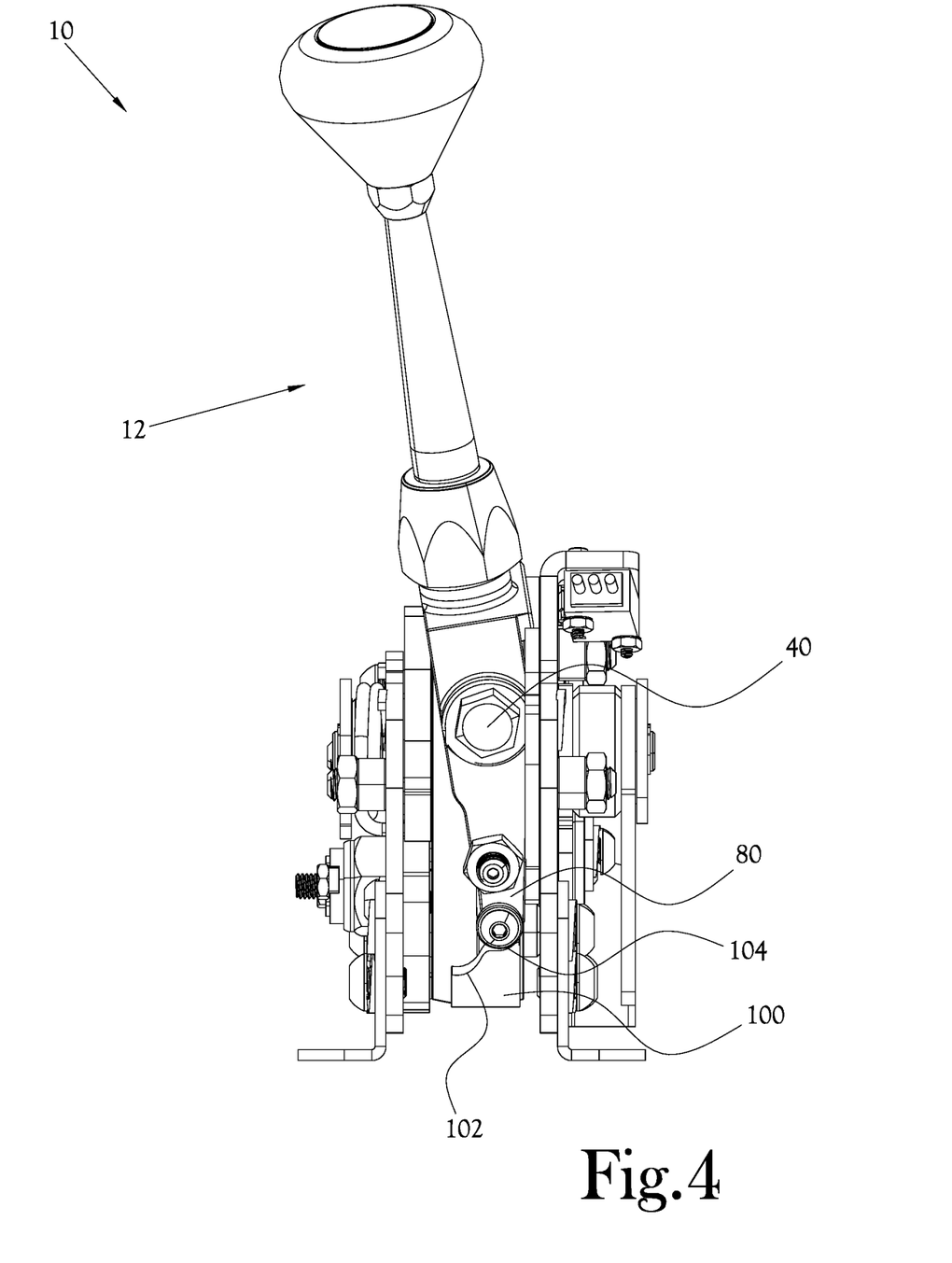
FIG. 4 illustrates a front view of the automatic transmission shifter mechanism of FIG. 1 in the manual shifting position.
Figure 5:
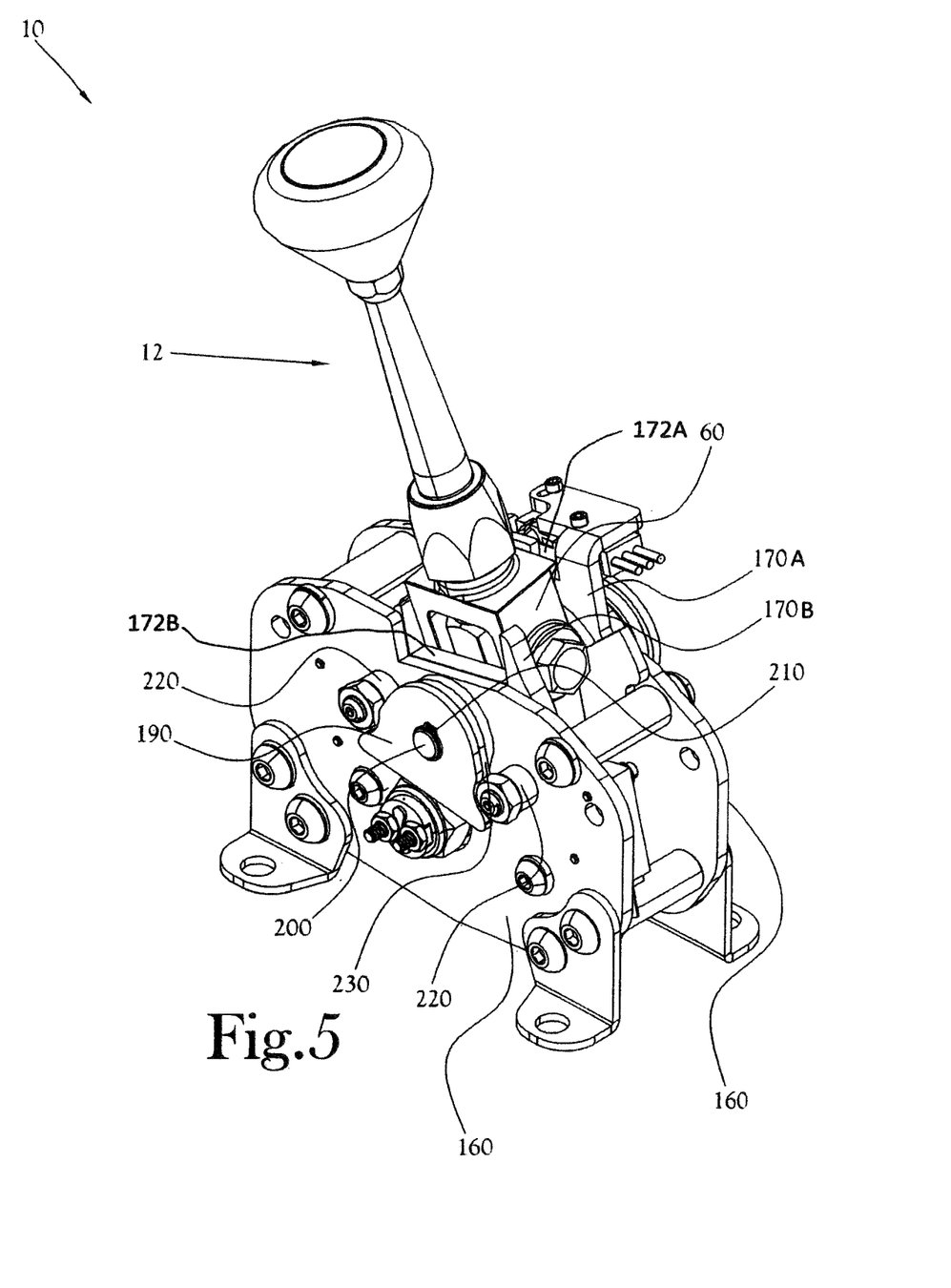
FIG. 5 illustrates a perspective view of the automatic transmission shifter mechanism of FIG. 1 in the manual shifting position.

FIG. 4 illustrates a front view of the automatic transmission shifter mechanism of FIG. 1 in the manual shifting position, and FIG. 5 illustrates a perspective view of the automatic transmission shifter mechanism of FIG. 1 in the manual shifting position. As illustrated in FIGS. 4-5, to selectively change the shifter mechanism 10 from the normal automatic mode to the manual shifting mode the operator simply moves the shifter assembly 12 laterally, in a direction away from the first electronic shifter module 130A in this example embodiment, to a manual shifting position. In this example embodiment of the present general inventive concept, the shifter assembly 12 can only be moved to the manual shifting position when the transmission is in overdrive. As illustrated in FIG. 4, the shifter assembly 12, which was positioned in overdrive immediately before being moved laterally to the manual shifting position, has been moved by moving the shifter know 30 in a direction away from the first electronic shifter module 130A. As a result, the position holding member provided proximate the distal end of the lower shaft projection 80 has been moved into register with the upper detent 104 of the lower block 100. Because the position of the position holding member is fixed at a point on the lower shaft projection 80, and the lower block 100 is coupled to the distal end of the lower shaft projection 80 in a biased and movable configuration, the register between the position holding member and the upper detent 104 causes the lower block 100 to become disengaged with the detents 112 of the detent plate 120 in the same manner as if the lockout button 50 had been pressed, and that position will be maintained as long as the shifter assembly 12 is in the manual shifting position. By moving the shifter knob 30 in the direction away from the first electronic shifter module 130A, the shifter assembly 12 rotates around the second pivot point 90 and the lower shaft projection 80 moves in the opposite direction, towards the upper detent 104 of the lower block 100. This action forces the lower block 100 and lower block pin 110 in a downward direction away from the detents 112. The shifter assembly 12 is thus no longer constrained in the normal automatic shifting position, and is able to shift freely between gears through interaction with the second and third electronic shifter modules 130B,130C as discussed herein. This manual shifting mode may be referred to as the sport mode.

As illustrated FIG. 5, in this example embodiment first and second slotted plates 170A,170B are provided respectively inside and adjacent the two main side plates 160 of the shifter mechanism 10. The first slotted plate 170A is provided between the shifter base 60 and the main side plate 160 adjacent the first electronic shifter module 130A, and the second slotted plate 170B is provided between the shifter base 60 and the main side plate 160 on the side opposite the first slotted plate 17A. Each of the first and second slotted plates 170A,170B are respectively configured with receiving slots 172A,172B that are configured to receive at least a portion of the shifter base 60. The width of the receiving slots 172A,172B are configured to receive a portion of the shifter base 60 in substantially a slip fit so as to reduce any "play" between the shifter base 60 and edges of the slots 172A,172B. Generally, the width of the slots 172A,172B are substantially the same size as the distance between the forward and back surfaces of the shifter base 60, and just large enough so that the shifter base 60 can move freely in a lateral direction between the slots when the shifter assembly 12 is rotated from the normal automatic transmission mode into the manual shifting mode, and vice versa.

When the shifter assembly 12 is in the normal automatic mode, the shifter assembly 12 is substantially vertical and the shifter base 60 is received in the slot 172A of the first slotted plate 170A. The first slotted plate 170A is configured to rotate about the first pivot point 200 to interact with the automatic transmission linkage 180 to allow the operator to move the vehicle between park, neutral, drive, etc. As previously noted, the shifter base 60 causes the first electronic shifter module 130A to sense the normal automatic mode when the shifter base 60 is received in the slot 172A. When the operator selects the manual shifting mode by moving the shifter assembly 12 laterally, the shifter base 60 moves out of the slot 172A and into the slot 172B of the second slotted plate 170B. This rotation from normal mode into manual mode is only possible from one position within the normal automatic transmission mode, that is, when the shifter base 60 is lined up directly within the slot 172B in the second slotted plate 170B. In an example embodiment of the invention, that position within the normal automatic transmission mode would be overdrive. In any other position, the shifter base 60 would not be lined up directly within the slot 172B of the second slotted plate 170B, and the second slotted plate 170B would prohibit the shifter base 60 from moving into the slot 172B corresponding to the manual shifting mode.

FIG. 1 illustrates the automatic transmission linkage 180 attached to one of the main side plates 160. The automatic transmission linkage 180 is connected by way of a series of gears (not shown) to the first slotted plate 170A. As previously described, when the shifter assembly 12 is in the normal automatic transmission mode and the shifter base 60 is in the slot 172A of the first slotted plate 170A, movement of the shifter assembly 12 in the fore/aft position drives the automatic transmission linkage 180. When the shifter assembly 12 is in the manual shifting mode and the shifter base 60 is in the slot 172B of the second slotted plate 170B, the second slotted plate 170B is configured to act as a rocker plate to control the movement of the shifter assembly 12. The second slotted plate 170B is also configured to rotate about the first pivot point 200, like the first second slotted plate 170A. However, the first and second slotted plates 170A,170B are configured to rotate independently of one another. In the manual shifting mode, the shifter assembly 12 can be pushed forward to move up a gear, and can be pulled back to move down a gear. The forward and backward movement of the second slotted plate 170B, which moves in register with the shifter assembly 12 in the manual shifting mode, is limited by stopping members provided at an inner surface of the main side plate 160 adjacent the second slotted plate 170B. In this example embodiment, the second slotted plate 170B is biased in both the forward and back directions to maintain a centered position which will receive the shifter base 60 in the slot 172B, and which will allow the shifter assembly 12 to be moved such that the shifter base 60 moves immediately into the slot 172A of the first slotted plate 170A. In this example embodiment, the second slotted plate 170B is biased by wound spring 230 provided at an outer surface of the main side plate 160 adjacent the second slotted plate 170B. The wound spring 230, which is held in place by a spring plate 190 that may interact with two protrusions 220 provided on the outer surface of the main side plate 160, is configured such that both respective ends are bent to enter slots in the main side plate to contact corresponding spring receiving portions (such as, for example, detents in the outer edge) of the second slotted plate 170B to bias the second slotted plate 170B in forward and back directions. The slots are elongated and curved to allow the bias to be overcome by the operator's movement of the shifter assembly 12 in the forward and back directions, but to stop movement at a predetermined terminal position in each direction. Thus, for example, moving the shifter assembly 12 forward to move up one gear pushes against an end of the spring that is biasing the shifter assembly 12 in the backward direction, and the forward movement will be stopped when the spring contacts the end of the slot through which the spring extends. Similarly, when the spring moves the shifter assembly 12 back to the centered position, the spring will stop movement by the backward bias portion of the spring when that portion meets the other end of the slot through which the spring extends. In various example embodiments, the spring plate 190 is attached to the adjacent main side plate 160 by a rod centered on the first pivot point 200 and secured in place with a mechanical locking mechanism 210. The rod 200 extends through the main side plate 160 and through the shifter assembly to reach the first slotted plate 170A at the first pivot point 200.

In the example embodiments illustrated in these drawings, second and third electronic shifter modules 130B,130C are provided adjacent the main side plate 160 that is adjacent the second slotted plate 170B to sense up and down shifting in the manual shifting mode. As illustrated in FIG. 2, the second electronic shifter module 130B is provided proximate a forward inner surface of the main side plate adjacent to second slotted plate 170B, and is configured to sense the forward movement of the shifter assembly 12 in the manual shifting mode. In this example embodiment, the second electronic shifter module 130B is configured such that contact from the second slotted plate 170B when rotated forward closes a switch indicating the forward position of the shifter assembly 12. Similar to the configuration of the first electronic shifter module 130A, the second electronic shifter module 130B may include a biased rolling member that maintains contact with a forward outer edge of the second slotted plate 170B, but such that only forward rotation of the second slotted plate 170B to the terminal point causes the rolling member to be pushed toward a button to actuate the switch. In such a configuration, the forward outer edge of the second slotted plate 170B may be contoured such that contact with the rolling member of the second electronic shifter module 130B may be maintained, but not sufficiently pressed until the "rocker plate" has been rotated forward to the terminal point to indicate a gear change. In various example embodiments, the second slotted plate 170B may be a cam configured to actuate such contact. Similarly, the third electronic shifter module 130C, which is provided proximate a back inner surface of the main side plate adjacent to second slotted plate 170B, may include a biased rolling member that maintains contact with a back outer edge of the second slotted plate 170B, but such that only backward rotation of the second slotted plate 170B to the terminal point causes the rolling member to be pushed toward a button to actuate the switch. In such a configuration, the back outer edge of the second slotted plate may be contoured such that contact with the rolling member of the third electronic shifter module 130C may be maintained, but not sufficiently pressed until the "rocker plate" has been rotated backward to the terminal point. Release of the shifter assembly 12 back into the central position releases pressure on the corresponding buttons or other such contact sensors. Thus, electronic sensing of the operator's shifting of the shifter assembly 12 forward and backward in the manual shifting mode causes electronic control of the corresponding gear changes. In this example embodiment, each of the electronic shifter modules 130A,130B,130C contains a button (not shown) which, when depressed, communicates with an electronic controller to affect the gear and/or mode changes.

When the shifter assembly 12 is in normal automatic transmission mode, the shifter base 60 is not in the slot 172B of the second slotted plate 170B, and movement of the shifter assembly 12 does not engage the second and third electronic modules 130B,130C, which are fore and aft of the second slotted plate 170B, and the buttons on the two electronic modules 130 remained in their neutral, non-depressed state. Additionally, when the shifter assembly 12 is in normal automatic transmission mode, the shifter base 60 causes the button on the first electronic module 130A to sense and indicate the normal automatic mode to the electronic controller.

Various example embodiments of the present general inventive concept may provide an automatic transmission shifter mechanism that is selectable between an automatic transmission mode and a manual shifting mode, including a shifter assembly configured to move in a first range of movement to be positioned in the automatic transmission mode, and to move in a second range of movement to selectively shift gears up and down in the manual shifting mode, a first sensor configured to sense that the shifter assembly is in the automatic transmission mode in response to the shifter assembly being in the first range of movement, and at least a second sensor configured to sense gear changes in the manual shifting mode, wherein the shifter assembly is configured to be selectively moved laterally from the first range of movement to the second range of movement when in a drive mode in the first range of movement. The first range of movement may be substantially parallel to the second range of movement, the lateral movement may be substantially perpendicular to the first and second range of movement, and reversing the lateral movement of the shifter assembly may move from the second range of movement to the first range of movement. A base member of the shifter assembly may be configured to be in physical communication with the first sensor when the shifter assembly is in the first range of movement. The automatic transmission shifter mechanism may further include a pivoting portion that is coupled to the base member of the shifter assembly when the shifter assembly is in the second range of movement, wherein the pivoting portion contacts the at least a second sensor to actuate sensing of the gear changes in the manual shifting mode. The at least a second sensor may include the second sensor and a third sensor, the second sensor being configured to be contacted by the pivoting portion when the shifter assembly is pushed forward, and the third sensor being configured to be contacted by the pivoting portion when the shifter assembly is pushed backward. The pivoting portion may be configured as a cam that maintains physical communication with both the second and the third sensor throughout the second range of movement, and which causes sufficient pressure to actuate the second and the third sensors when the shift assembly is at terminal points of the second range of movement. The automatic transmission shifter mechanism may further include at least one biasing member configured such that the pivoting portion is biased in forward and backward directions in the second range of movement such that a central position is maintained without user interaction. The pivoting portion may be configured with a receiving portion that substantially conforms to a portion of the base member received therein to couple the pivoting portion to the base member.

Various example embodiments of the present general inventive concept may provide an automatic transmission shifter mechanism that is selectable between an automatic transmission mode and a manual shifting mode, including a shifter assembly, a block attached to the shifter assembly, a pin attached to the block, at least one slotted plate which interacts with the shifter assembly, and a detent plate proximate to the block, wherein selected shifter assembly positions in the automatic transmission mode are maintained by the pin being located within a corresponding detent of the detent plate, and wherein a predetermined movement of the shifter assembly causes the pin to move out of range of detents in the detent plate such that an operator can shift freely between drive gears in the manual shifting mode. The automatic transmission shifter mechanism may further include a lockout button attached to a knob on the shifter assembly, wherein depression of the lockout button causes the pin to move away from the detent plate and allows the operator to shift from park into reverse and drive gears while in the automatic transmission mode. The shifter assembly may be configured to be moved in a forward or rearward direction to shift between drive gears in the manual shifting mode. The automatic transmission shifter mechanism may further include a shifter base integral with the shifter assembly, and a lower shaft projection at the lower end of the shifter base. The manual shifting mode may be activated by an operator moving a portion of the shifter base into a receiving portion of the slotted plate. Movement of the portion of the shifter base into the receiving portion of the slotted plate may move the block in a downward direction and simultaneously moves the pin out of range of detents in the detent plate. An upper surface of the block may include first and second detents, the second detent formed at a higher position than the first detent, and wherein movement of the portion of the shifter base into the receiving portion of the slotted plate causes the lower shaft projection to register with the second detent, which moves the block in a downward direction and simultaneously moves the pin out of range of detents in the detent plate. The automatic transmission shifter mechanism may further include an electronic controller, at least one electronic module in direct or indirect contact with the shifter assembly, a button on the at least one electronic module, wherein a movement of the shifter assembly may cause the button on the at least one electronic module to be engaged. Engagement of the button on the at least one electronic module may cause the at least one electronic module to communicate with the controller. The at least one electronic module attached to the shifter assembly may include first and second electronic modules, movement of the shifter assembly in one direction in the manual shifting mode may cause engagement with the button on the first electronic module and movement of the shifter assembly in the opposite direction causes engagement with the button on the second electronic module, the button on the first electronic module and the button on the second electronic module may be configured to not be engaged simultaneously and engagement of either the button on the first electronic module or the button on the second electronic module may cause the respective first or second electronic module to communicate with the controller. The at least one electronic module attached to the shifter assembly may include a third electronic module, and when the automatic transmission shifter mechanism is in the automatic transmission mode, the button on the third electronic module may be engaged and may cause the third electronic module to communicate with the controller. When the automatic transmission shifter mechanism is in the manual shifting mode, the button on the third electronic module may not be engaged, and when the automatic transmission shifter mechanism is in the automatic shifting mode, the buttons on the first and second electronic modules may not be engaged.

Numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. An automatic transmission shifter mechanism that is selectable between an automatic transmission mode and a manual shifting mode, comprising:
    a shifter assembly;
    a block attached to the shifter assembly;
    a pin attached to the block;
    at least one slotted plate which interacts with the shifter assembly;
    a detent plate proximate to the block; and
    a shifter base integral with the shifter assembly;
    wherein selected shifter assembly positions in the automatic transmission mode are maintained by the pin being located within a corresponding detent of the detent plate;
    wherein a predetermined movement of the shifter assembly causes the pin to move out of range of detents in the detent plate such that an operator can shift freely between drive gears in the manual shifting mode; and
    wherein the manual shifting mode is activated by an operator moving a portion of the shifter base into a receiving portion of the slotted plate.

2. The automatic transmission shifter mechanism according to claim 1, further comprising a lockout button attached to a knob on the shifter assembly, wherein depression of the lockout button causes the pin to move away from the detent plate and allows the operator to shift from park into reverse and drive gears while in the automatic transmission mode.

3. The automatic transmission shifter mechanism according to claim 1, wherein the shifter assembly is configured to be moved in a forward or rearward direction to shift between drive gears in the manual shifting mode.

4. The automatic transmission shifter mechanism according to claim 1, further comprising lower shaft projection at the lower end of the shifter base.

5. The automatic transmission shifter mechanism according to claim 4, wherein movement of the portion of the shifter base into the receiving portion of the slotted plate moves the block in a downward direction and simultaneously moves the pin out of range of detents in the detent plate.

6. The automatic transmission shifter mechanism according to claim 5, wherein an upper surface of the block comprises first and second detents, the second detent formed at a higher position than the first detent, and wherein movement of the portion of the shifter base into the receiving portion of the slotted plate causes the lower shaft projection to register with the second detent, which moves the block in a downward direction and simultaneously moves the pin out of range of detents in the detent plate.

7. The automatic transmission shifter mechanism according to claim 6, further comprising:
    at least one electronic module in direct or indirect contact with the shifter assembly and configured for communication with an electronic controller;
    a button on the at least one electronic module;
    wherein a movement of the shifter assembly causes the button on the at least one electronic module to be engaged, and wherein engagement of the button on the at least one electronic module causes the at least one electronic module to communicate with the electronic controller.

8. The automatic transmission shifter mechanism according to claim 7, wherein the at least one electronic module attached to the shifter assembly includes first and second electronic modules;

movement of the shifter assembly in one direction in the manual shifting mode causes engagement with the button on the first electronic module and movement of the shifter assembly in the opposite direction causes engagement with the button on the second electronic module; and engagement of either the button on the first electronic module or the button on the second electronic module causes the respective first or second electronic module to communicate with the controller.

9. The automatic transmission shifter mechanism according to claim 8, wherein the button on the first electronic module and the button on the second electronic module are configured to not be engaged simultaneously.

10. The automatic transmission shifter mechanism according to claim 9, wherein the at least one electronic module attached to the shifter assembly includes a third electronic module; and when the automatic transmission shifter mechanism is in the automatic transmission mode, the button on the third electronic module is engaged and causes the third electronic module to communicate with the controller.

11. The automatic transmission shifter mechanism according to claim 10, wherein when the automatic transmission shifter mechanism is in the manual shifting mode, the button on the third electronic module is not engaged, and when the automatic transmission shifter mechanism is in the automatic transmission mode, the buttons on the first and second electronic modules are not engaged.

* * * * *